United States Patent [19]

Klomp

[11] Patent Number: 4,502,325

[45] Date of Patent: Mar. 5, 1985

[54] MEASUREMENT OF MASS AIRFLOW INTO AN ENGINE

[75] Inventor: Edward D. Klomp, Mt. Clemens, Mich.

[73] Assignee: General Motors Corporation, Detroit, Mich.

[21] Appl. No.: 530,429

[22] Filed: Sep. 8, 1983

[51] Int. Cl.³ ............................................. G01M 15/00
[52] U.S. Cl. ..................................... 73/118; 73/861.02
[58] Field of Search ................ 73/118, 861.01, 861.02, 73/861.03

[56]  References Cited

U.S. PATENT DOCUMENTS 3,958,447  5/1976  Baker et al. .................. 73/861.02 X
4,279,146  7/1981  Wessel et al. ...................... 73/118 A
4,285,246  8/1981  Kita ................................. 73/861.03
4,419,898  12/1983  Zanker et al. .................... 73/861.02

Primary Examiner—Jerry W. Myracle
Attorney, Agent, or Firm—Warren D. Hill

[57] ABSTRACT

To measure the mass airflow into an engine having a manifold with a given volume, the mass airflow through an induction passage into the manifold is measured by a meter and the measured value is changed by an amount to compensate for changes of air density in the manifold. The manifold pressure and temperature are monitored and the correction value is calculated as where V is the manifold volume, R is a gas constant, T is the temperature and P is the air pressure in the manifold.

4 Claims, 2 Drawing Figures

MEASUREMENT OF MASS AIRFLOW INTO AN ENGINE

This invention relates to a method of measuring mass airflow into an engine and, particularly, to such a method which compensates for the air density changes in the manifold.

One method of electronic fuel control for an internal combustion engine requires that the mass airflow into the engine be measured in order to determine the correct amount of fuel to inject into the airstream. To that end, various types of anemometers have been devised to measure the air flowing through an induction passage whence it flows through a manifold to the several cylinders of an engine. When fuel is injected into the induction passage, the correct amount of fuel is readily calculated on a basis of the measured mass airflow. In this case, however, where the fuel is injected into the airstream downstream of the manifold, that is, at the engine intake port or into the combustion chambers of the engine, the measured airflow in the induction passage is no longer an accurate instantaneous measure of the airflow to the engine because of possible changes of air density in the manifold volume. When the throttle valve in the throttle body upstream of the manifold is opening, the manifold pressure increases and when the throttle valve is closing, the manifold pressure decreases so it follows that the mass of air within the manifold is not constant. That is, the rate of airflow into the manifold is not necessarily the same as the rate of airflow out of the manifold.

It is therefore a general object of the invention to provide a method of measuring the mass airflow into an engine through a manifold based upon the mass airflow measurement upstream of the manifold.

The invention is carried out by measuring the mass airflow in an induction passage upstream of the engine manifold and measuring the manifold pressure and compensating the measured value by an amount dependent upon the rate of change of manifold pressure.

The above and other advantages of the invention will become more apparent from the following description taken in conjunction with the accompanying drawings wherein like reference numerals refer to like parts and wherein.

Figure 1:
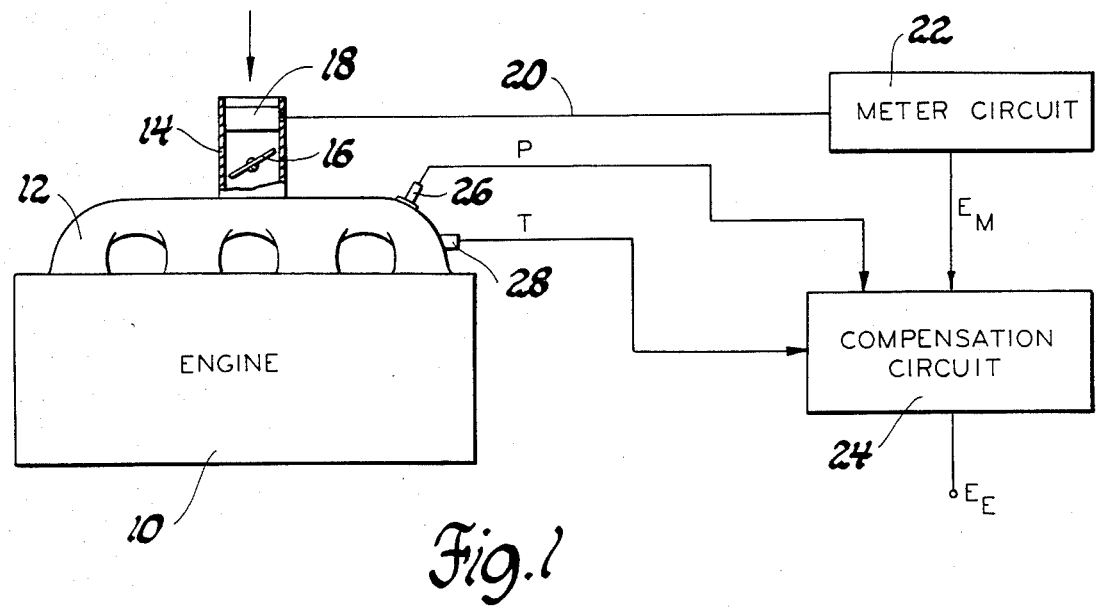
FIG. 1 is a schematic view of an internal combustion engine equipped with a manifold and including a mass airflow measuring circuit with a compensation circuit to carry out the method of the invention.

Referring to FIG. 1, an internal combustion engine 10 containing a plurality of cylinders is equipped with a manifold 12 for supplying air to the intake port of each cylinder. An induction passage or throttle body 14 containing a throttle valve 16 supplies air to the engine 10 through the manifold 12. A mass airflow sensor 18, shown as a block within the throttle body, produces an electrical signal on line 20 which is a function of the mass airflow through the throttle body. That signal is acted upon by a meter circuit 22 which emits an output voltage $E_M$ to a compensation circuit 24 which makes a correction for density transients occurring in the manifold 12 and provides an output signal $E_E$. A pressure sensor 26 is coupled to the manifold 12 to continuously monitor the instantaneous air pressure within the manifold and provides a corresponding electrical pressure signal P to the compensation circuit 24 and similarly, a thermocouple or other temperature sensor 28 coupled to the manifold provides an air temperature signal T to the compensation circuit 24. The anemometer, which includes the sensor 18 and the meter circuit 22, may be any of a variety of suitable types such as a hot wire or hot film anemometer or an acoustic anemometer, for example. Depending upon the type of anemometer, the output signal $E_M$ from the sensor circuit 22 may be directly proportional to the mass airflow through the throttle body or may be a more complex function of the mass airflow.

Figure 2:
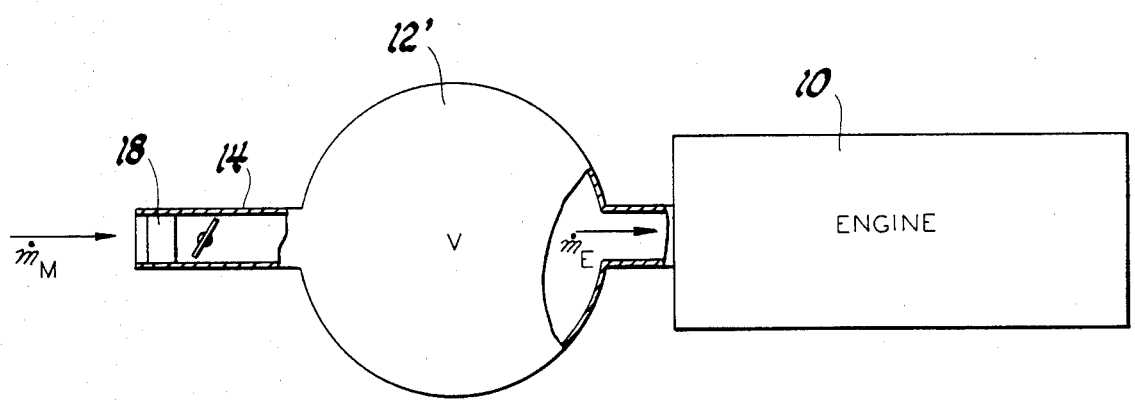
FIG. 2 is a diagram illustrating the principles involved in the arrangement of FIG. 1.

The analysis of the compensation method according to the invention is provided for the case where the anemometer has a linear output, i.e., the output is proportional to the mass airflow through the throttle body. Referring to FIG. 2, the throttle body 14 is shown connected to a plenum 12' having a volume V representing the volume of the manifold, the plenum in turn being connected to input ports of the engine 10. A mass airflow rate through the throttle body is denoted by the arrow $m_M$ and is detected by the airflow sensor 18 while the mass airflow rate of immediate interest, that is, the airflow into the engine is denoted by the arrow $m_E$. Under steady state operating conditions, the mass flow rate passing through the flow meter is equal to that entering the engine, however, if the air density $\rho$ in the plenum is being altered, that is no longer true. Instead, the following relationship holds $$\dot{m}_E = \dot{m}_M - V \frac{d\rho}{dt}$$

Since the fluid density is related to the plenum pressure P and the temperature T by $$\rho = \frac{P}{RT}$$

where R is a constant and the fluid temperature variation during the transients of interest in the engine manifold may be considered small, the rate of change of density is directly proportional to the rate of change of plenum pressure. That is, $$\frac{d\rho}{dt} = \frac{1}{RT} \frac{dP}{dt}$$

It follows that $$\dot{m}_E = \dot{m}_M - \frac{V}{RT} \frac{dP}{dt}$$

As applied to the system of FIG. 1 where a linear anemometer is used so that $E_M$ is proportional to the measured mass airflow rate $m_M$, and the output voltage $E_E$ is proportional to the mass airflow rate into the engine $m_E$, the compensation circuit with inputs of manifold pressure and temperature is operative to compute the value $$-\frac{V}{RT} \frac{dP}{dt}$$

to provide an output signal $E_E$ as follows:

$$E_E = E_M - \frac{KV}{RT}\frac{dP}{dt}$$

where K is a proportionality constant.

In a hot wire or hot film anemometer, the output voltage is not linear and is determined by the following relationship $$\dot{m}_M = \left(\frac{E_M}{K'}\right)^{1/K''}$$

where K' and K'' are constants. Applying the above analysis to such a hot element anemometer, it can be shown that the output signal compensated for the air density changes is as follows $$E_E = K'\left[\left(\frac{E_M}{K'}\right)^{1/K''} - \frac{V}{RT}\frac{dP}{dt}\right]^{K''}$$

It will thus be seen that in order to calculate the mass airflow into an engine for the determination of the amount of fuel to be applied to the engine intake ports or combustion chamber, an accurate measurement can be made by the method of this invention using mass airflow meters of known types situated in convenient induction passage locations upstream of the engine intake manifold.

The embodiments of the invention in which an exclusive property or privilege is claimed are defined as follows:

1. The method of measuring mass airflow into an engine through an intake plenum subject to air density changes in the plenum comprising the steps of:
   measuring the mass airflow into the plenum,
   determining the rate of air density change in the plenum, and
   adjusting the airflow measurement by a function of the rate of air density change to compensate for air density transients, whereby the adjusted airflow measurement represents mass airflow into the engine.

2. The method of measuring mass airflow into an engine through an induction passage and intake manifold subject to air density change in the manifold comprising the steps of:
   measuring the mass airflow through the induction passage and flowing into the manifold,
   measuring the rate of pressure change in the manifold, and
   adjusting the airflow measurement by a function of the rate of pressure change to compensate for air density transients, whereby the adjusted airflow measurement represents mass airflow into the engine.

3. The method of measuring mass airflow into an engine through an induction passage and an intake manifold subject to air density change in the manifold comprising the steps of:
   measuring the mass airflow through the induction passage and flowing into the manifold,
   measuring the rate of pressure change dP/dt in the manifold,
   measuring the air temperature T in the manifold, and
   adjusting the airflow measurement by a function of V/T (dP/dt) where V is the volume of the manifold to compensate for air density transients, whereby the adjusted airflow measurement represents mass airflow into the engine.

4. The method of measuring mass airflow into an engine through an induction passage and an intake manifold having a volume V subject to air density changes in the manifold comprising the steps of:
   measuring the mass airflow $m_M$ through the induction passage and flowing into the manifold by a hot element anemometer to obtain a meter voltage $E_M$ such that $$\dot{m}_M = \left(\frac{E_M}{K'}\right)^{1/K''}$$

where K' and K'' are constants,
   measuring the rate of pressure change dP/dt in the manifold,
   measuring the air temperature T in the manifold, and
   adjusting the airflow measurement by a function of the rate of pressure change and the manifold volume to compensate for air density transients to obtain an adjusted airflow measurement $$E_E = K'\left[\left(\frac{E_M}{K'}\right)^{1/K''} - \frac{V}{RT}\frac{dP}{dt}\right]^{K''}$$

where $E_E$ is a function of mass airflow into the engine and R is a gas constant.

* * * * *

UNITED STATES PATENT AND TRADEMARK OFFICE
CERTIFICATE OF CORRECTION

PATENT NO. : 4,502,325

DATED : March 5, 1985

INVENTOR(S) : Edward D. Klomp

It is certified that error appears in the above-identified patent and that said Letters Patent is hereby corrected as shown below:

Column 2, line 23, "$m_M$" should read -- $\dot{m}_M$ --.

Column 2, line 25, "$m_M$" should read -- $\dot{m}_M$ --.

Column 4, line 26, "$m_M$" should read -- $\dot{m}_M$ --.

Signed and Sealed this

Twenty-fifth Day of November, 1986

Attest:

DONALD J. QUIGG

*Attesting Officer*  *Commissioner of Patents and Trademarks*